United States Patent
Liu et al.

(10) Patent No.: US 11,640,550 B2
(45) Date of Patent: May 2, 2023

(54) METHOD AND APPARATUS FOR UPDATING DEEP LEARNING MODEL

(71) Applicant: BEIJING BAIDU NETCOM SCIENCE AND TECHNOLOGY CO., LTD., Beijing (CN)

(72) Inventors: Lan Liu, Beijing (CN); Faen Zhang, Beijing (CN); Kai Zhou, Beijing (CN); Qian Wang, Beijing (CN); Kun Liu, Beijing (CN); Yuanhao Xiao, Beijing (CN); Dongze Xu, Beijing (CN); Tianhan Xu, Beijing (CN); Jiayuan Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1273 days.

(21) Appl. No.: 16/026,976

(22) Filed: Jul. 3, 2018

(65) Prior Publication Data
US 2019/0012576 A1  Jan. 10, 2019

(30) Foreign Application Priority Data
Jul. 4, 2017  (CN) .......................... 201710539193.1

(51) Int. Cl.
*G06K 9/62* (2022.01)
*G06N 20/00* (2019.01)

(52) U.S. Cl.
CPC ......... *G06K 9/6256* (2013.01); *G06K 9/6215* (2013.01); *G06K 9/6262* (2013.01); *G06N 20/00* (2019.01)

(58) Field of Classification Search
CPC .. G06K 9/6256; G06K 9/6215; G06K 9/6262; G06N 20/00
See application file for complete search history.

(56) References Cited

U.S. PATENT DOCUMENTS

2004/0221237 A1* 11/2004 Foote .................. G06F 16/7328
715/700
2007/0156341 A1   7/2007 Langlais et al.
(Continued)

FOREIGN PATENT DOCUMENTS

CN          102215138 A      10/2011
CN          103714262 A       4/2014
(Continued)

OTHER PUBLICATIONS

基于网络中对象关系的信息检索和结构分析及应用, In-Network Information Retrieval Structure Analysis and Their Applications, Jan. 18, 2014, 88 pages.
(Continued)

*Primary Examiner* — Brent Johnston Hoover
(74) *Attorney, Agent, or Firm* — Cozen O'Connor (57) ABSTRACT

The disclosure discloses a method and apparatus for updating a deep learning model. An embodiment of the method comprises: executing following updating: acquiring a training dataset under a preset path, training a preset deep learning model based on the training dataset to obtain a new deep learning model; updating the preset deep learning model to the new deep learning model; increasing training iterations; determining whether a number of training iterations reaches a threshold of training iterations; stopping executing the updating if the number of training iterations reaches the threshold of training iterations; and continuing to execute the updating after an interval of a preset time length if the number of training iterations fails to reach the threshold of training iterations. This embodiment has improved the model updating efficiency.

12 Claims, 4 Drawing Sheets

(56) References Cited

U.S. PATENT DOCUMENTS

| | | | |
|---|---|---|---|
| 2013/0044129 A1 | 2/2013 | Latta et al. | |
| 2014/0348419 A1* | 11/2014 | Dayan | G06K 9/6217 |
| | | | 382/159 |
| 2016/0371601 A1* | 12/2016 | Grove | G06N 20/00 |
| 2017/0228645 A1* | 8/2017 | Wang | G06N 3/0454 |
| 2020/0019882 A1* | 1/2020 | Garg | G06F 3/0484 |

FOREIGN PATENT DOCUMENTS

| | | |
|---|---|---|
| CN | 105225217 A | 1/2016 |
| CN | 106339667 A | 1/2017 |
| CN | 106600000 A | 4/2017 |
| CN | 106685674 A | 5/2017 |
| CN | 106691440 A | 5/2017 |
| CN | 106845235 A | 6/2017 |
| WO | WO 2016084336 A1 | 6/2016 |

OTHER PUBLICATIONS

Zhang et al., Staleness-aware Async-SGD for Distributed Deep Learning, 7 pages.

\* cited by examiner

METHOD AND APPARATUS FOR UPDATING DEEP LEARNING MODEL

CROSS-REFERENCE TO RELATED APPLICATIONS

This application claims priority to Chinese Patent Application No. 201710539193.1, filed with the State Intellectual Property Office of the People's Republic of China (SIPO) on Jul. 4, 2017, the content of which is incorporated herein by reference in its entirety.

TECHNICAL FIELD

The disclosure relates to the field of computer technology, specifically to the field of Internet technology, and more specifically to a method and apparatus for updating a deep learning model.

BACKGROUND

A model, as an important concept in machine learning, simply speaking, refers to the mapping from a characteristic space to an output space, and generally is constituted by a hypothesis function and model parameters. Commonly used models in industry include logistic regression (LR), gradient boosting decision tree (GBDT), support vector machine (SVM), deep neural network (DNN), and the like.

Deep learning is a branch of machine learning, and it's an algorithm that attempts to perform higher-level abstraction on data using a plurality of processing layers containing a complicated structure or composed of multiple nonlinear transformations.

At present, the operations of training and updating the deep learning model are usually triggered manually by a user, thereby leading to low efficiency in updating the deep learning model.

SUMMARY

An object of the disclosure is to provide a method and apparatus for updating a deep learning model, to solve the technical problems mentioned in the background part.

In a first aspect, an embodiment of the disclosure provides a method for updating a deep learning model, the method including: executing following updating: acquiring a training dataset under a preset path, training a preset deep learning model based on the training dataset to obtain a new deep learning model; updating the preset deep learning model to the new deep learning model; increasing a number of training; determining whether the number of training reaches a threshold of the number of training; stopping executing the updating if the number of training iterations reaches the threshold of training iterations; and continuing to execute the updating after an interval of a preset time length if the number of training fails to reach the threshold of the number of training.

In some embodiments, the training dataset under the preset path is provided with a dataset identifier containing a time stamp; and the acquiring a training dataset under a preset path includes: acquiring a training dataset with the time stamp contained in the dataset identifier matching a current time stamp under the preset path.

In some embodiments, the acquiring a training dataset with the time stamp contained in the dataset identifier matching a current time stamp under the preset path includes: calculating a similarity between the current time stamp and the time stamp contained in a dataset identifier of each training dataset under the preset path, and determining a time stamp with a highest similarity to the current time stamp as a target time stamp matching the current time stamp; and acquiring a training dataset with a dataset identifier containing the target time stamp under the preset path.

In some embodiments, the preset deep learning model has a training script corresponding to the preset deep learning model; and the training a preset deep learning model based on the training dataset to obtain a new deep learning model includes: running the training script to train the preset deep learning model based on the training dataset to obtain the new deep learning model.

In some embodiments, the training dataset under the preset path is generated through regularly running a preset training dataset generation code.

In some embodiments, when the new deep learning model is obtained, the updating further includes: saving the new deep learning model; and after updating the preset deep learning model to the new deep learning model, the updating further includes: sending a model updating prompt message to a user the preset deep learning model attributed to, where the prompt message includes at least one of following items of the new deep learning model: a save path, a save title, and a dataset identifier of the employed training dataset.

In a second aspect, an embodiment of the disclosure provides an apparatus for updating a deep learning model, the apparatus including: an updating unit, configured for executing following updating: acquiring a training dataset under a preset path, training a preset deep learning model based on the training dataset to obtain a new deep learning model; updating the preset deep learning model to the new deep learning model; increasing a number of training; determining whether the number of training reaches a threshold of the number of training; stopping executing the updating if the number of training reaches the threshold; and an execution unit, configured for continuing to execute the updating after an interval of a preset time length if the number of training fails to reach the threshold.

In some embodiments, the training dataset under the preset path is provided with a dataset identifier containing a time stamp; and the updating unit includes: an acquisition subunit, configured for acquiring a training dataset with the time stamp contained in the dataset identifier matching a current time stamp under the preset path.

In some embodiments, the acquisition subunit includes: a determining module, configured for calculating a similarity between the current time stamp and the time stamp contained in a dataset identifier of each training dataset under the preset path, and determining a time stamp with a highest similarity to the current time stamp as a target time stamp matching the current time stamp; and an acquisition module, configured for acquiring a training dataset with a dataset identifier containing the target time stamp under the preset path.

In some embodiments, the preset deep learning model has a training script corresponding to the preset deep learning model; and the updating unit includes: a training subunit, configured for running the training script to train the preset deep learning model based on the training dataset to obtain the new deep learning model.

In some embodiments, the training dataset under the preset path is generated through regularly running a preset training dataset generation code.

In some embodiments, the updating unit further includes: a saving subunit, configured for saving the new deep learning model; and a sending subunit, configured for sending a model updating prompt message to a user the preset deep learning model attributed to, where the prompt message includes at least one of following items of the new deep learning model: a save path, a save title, and a dataset identifier of the employed training dataset.

In a third aspect, an embodiment of the disclosure provides an electronic device, the electronic device including: one or more processors; and a memory for storing one or more programs, where the one or more programs, when executed by the one or more processors, cause the one or more processors to implement the method according to any one of the implementations in the first aspect.

In a fourth aspect, an embodiment of the disclosure provides a computer readable storage medium storing a computer program thereon, where the program implements, when executed by a processor, the method according to any one of the implementations in the first aspect.

The method and apparatus for updating a deep learning model provided by the embodiments of the present disclosure, through: executing the updating to acquire a training dataset under a preset path and train a preset deep learning model based on the training dataset to obtain a new deep learning model; updating the preset deep learning model to the new deep learning model to realize the upgrading of the preset deep learning model; progressively increasing the number of training while executing the updating, to determine whether the number of training reaches a threshold of the number of training; stopping executing the updating if the number of training reaches the threshold; and continuing to execute the updating after a preset time interval if the number of training fails to reach the threshold, thereby may realize regular training and updating of the preset deep learning model, improving the model updating efficiency.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The disclosure is further described in detail below in conjunction with the accompanying drawings and embodiments. It may be appreciated that the embodiments described herein are only used for explaining the disclosure, rather than limiting the disclosure. Furthermore, it should also be noted that only the parts related to the disclosure are shown in the accompanying drawings, for the ease of description.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
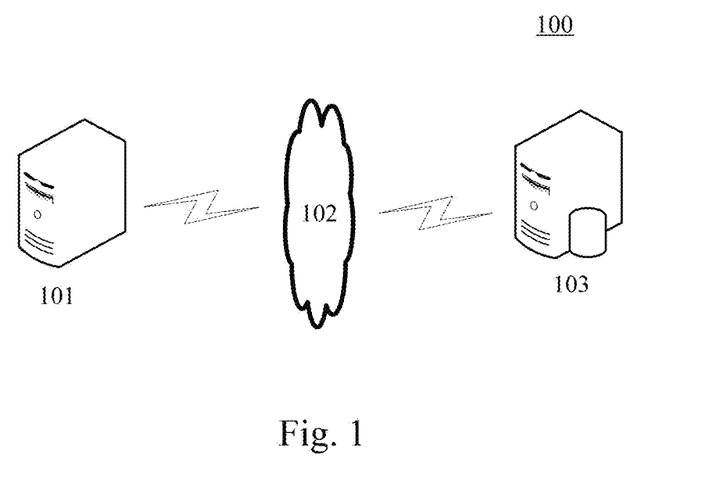
FIG. 1 is a structural diagram of an exemplary system in which the disclosure may be applied.

FIG. 1 shows an exemplary system architecture 100 in which the embodiments of the method or apparatus for updating a deep learning model according to the present disclosure may be applied.

As shown in FIG. 1, the system architecture 100 may include a model management server 101, a network 102, and a data storage server 103. The network 102 is used for providing a communication link medium between the model management server 101 and the data storage server 103. The network 102 may include a variety of connection types, such as a wired communication link, a wireless communication link, or a fiber cable.

The data storage server 103 may be a server that provides a variety of services, e.g., a server for storing data such as a training dataset.

The model management server 101 may be a server that provides a variety of services, e.g., a server for regularly executing training, updating, and other operations of the deep learning model.

It should be noted that the method for updating a deep learning model provided in the embodiments of the present disclosure is generally executed by the model management server 101. Accordingly, the apparatus for updating a deep learning model is generally set in the model management server 101.

It should be noted that, when the training dataset acquired by the model management server 101 is a pre-stored local training dataset in the model management server 101, the system architecture 100 may not include the data storage server 103.

It should be appreciated that the numbers of model management servers, networks and data storage servers in FIG. 1 are only illustrative. There may be any number of model management servers, networks and data storage servers based on implementation needs.

Figure 2:
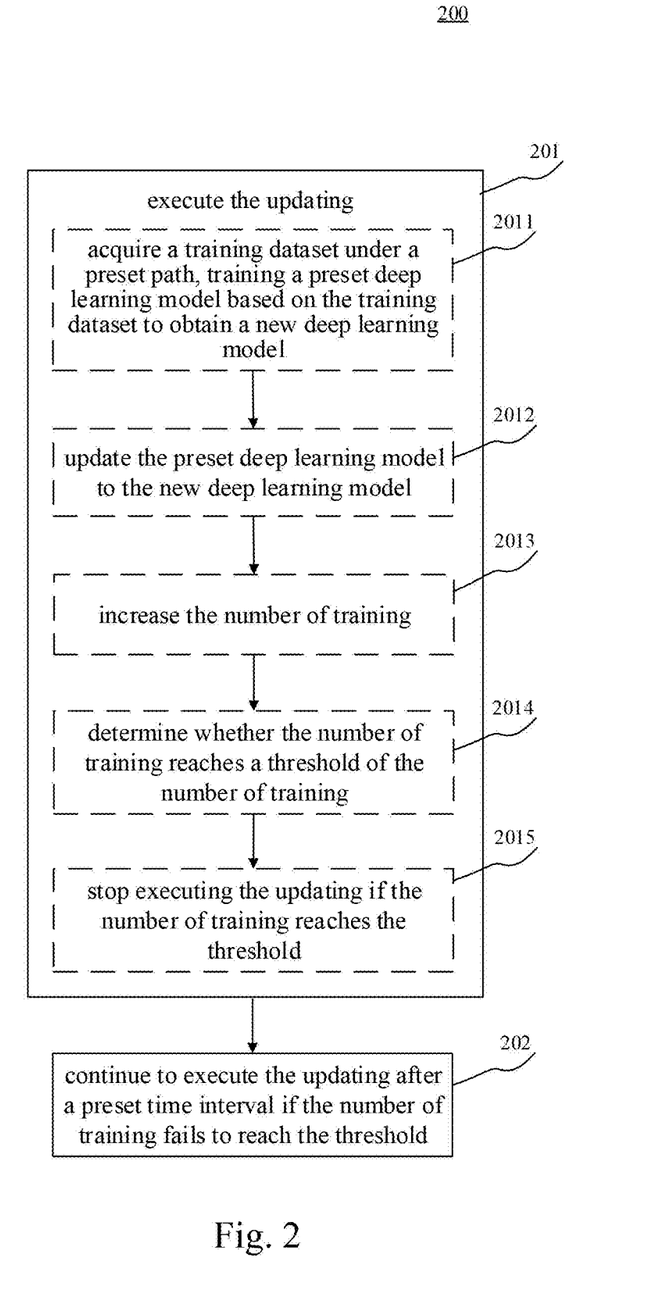
FIG. 2 is a flow chart of a method for updating a deep learning model according to an embodiment of the present disclosure.

By further referring to FIG. 2, which shows a flow 200 of a method for updating a deep learning model according to an embodiment of the present disclosure. The method for updating a deep learning model includes:

Step 201: executing the updating.

According to the present embodiment, an electronic device (e.g., the model management server 101 as shown in FIG. 1) in which the method for updating a deep learning model runs may execute the updating of a preset deep learning model, and the updating may include:

Step 2011: acquiring a training dataset under a preset path, training a preset deep learning model based on the training dataset to obtain a new deep learning model;

Step 2012: updating the preset deep learning model to the new deep learning model;

Step 2013: increasing the number of training;

Step 2014: determining whether the number of training reaches a threshold of the number of training; and Step 2015: stopping executing the updating if the number of training reaches the threshold.

In the present embodiment, the moment when the updating is executed for the first time may be preset by a user to whom the preset deep learning model is attributed, or automatically set by the electronic device, which is not limited by the present embodiment in any way.

In step 2011, the electronic device may acquire the latest created training dataset under the preset path. Here, the preset path may be a path in the electronic device, or may be a path in a server in remote communication connection with the electronic device (e.g., the data storage server 103 as shown in FIG. 1). It should be noted that the electronic device may retrieve characteristic information and estimate result from each training data of the acquired training dataset, and the electronic device may train the preset deep learning model using a deep learning method based on the characteristic information and the estimate result.

In step 2012, after receiving the new deep learning model, the electronic device may update the preset deep learning model to the new deep learning model, to enable the new deep learning model to be, e.g., used for executing online data prediction.

In step 2013, an initial value of the number of training may be zero. When each time increasing the number of training, the electronic device may, for example, increase the number of training by 1.

In step 2014, the threshold of the number of training may be manually set, or be automatically set by the electronic device, which is not limited by the embodiment in any way. The electronic device may, after determining the number of training reaches the threshold, execute step 2015. The electronic device may, if determining the number of training fails to reach the threshold, execute step 202.

In step 2015, the electronic device may, if determining the number of training reaches the threshold, stop executing the updating, i.e., no longer training and updating the preset deep learning model.

In some optional implementations of the present embodiment, the training dataset under the preset path may be provided with a dataset identifier containing a time stamp; and the electronic device may acquire a training dataset with a time stamp contained in a dataset identifier matching a current time stamp under the preset path, to train the preset deep learning model based on this training dataset. As an example, the electronic device may search a training dataset with a time stamp contained in a dataset identifier identical to a current time stamp under the preset path, and the electronic device may determine the time stamp contained in the dataset identifier of the training dataset matching the current time stamp.

In some optional implementations of the present embodiment, the electronic device may calculate a similarity between the current time stamp and the time stamp contained in a dataset identifier of each training dataset under the preset path, and determine a time stamp with a highest similarity to the current time stamp as a target time stamp; and the electronic device may acquire a training dataset with a dataset identifier containing the target time stamp under the preset path, to train the preset deep learning model based on this training dataset.

In some optional implementations of the present embodiment, the preset deep learning model has a training script corresponding to the preset deep learning model, and the electronic device may, through running the training script, train the preset deep learning model based on the acquired training dataset to obtain a new deep learning model.

In some optional implementations of the present embodiment, the training dataset under the preset path may be generated through regularly running a preset training dataset generation code, and the preset training dataset generation code may be written and uploaded to the electronic device by the user.

In some optional implementations of the present embodiment, when the electronic device obtains the new deep learning model, the updating may further include: saving the new deep learning model. After updating the preset deep learning model to the new deep learning model, the updating may further include: sending a model updating prompt message to the user, where the prompt message may include at least one of following items of the new deep learning model: a save path, a save title, a dataset identifier of the employed training dataset, and the like.

Step 202: continuing to execute the updating after a preset time interval if the number of training fails to reach the threshold of the number of training.

In the present embodiment, if the number of training fails to reach the threshold, the electronic device may continue to execute the updating after a preset time interval (e.g., one day, half a month, and one month). Here, the preset time interval may be in a unit, such as minute, hour, day, and month, which is not limited by the embodiment in any way.

Figure 3:
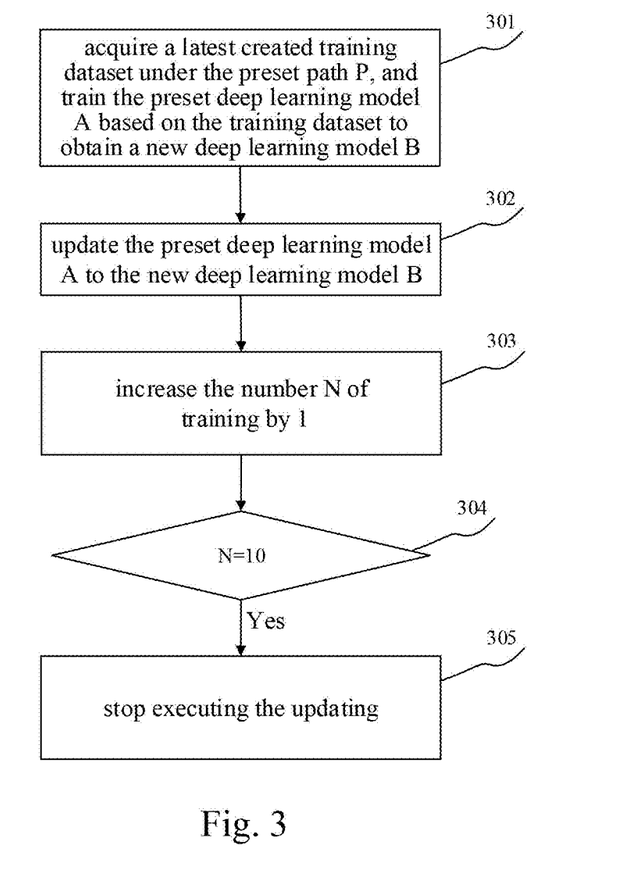
FIG. 3 is a schematic diagram of an application scenario of a method for updating a deep learning model according to the disclosure.

By further referring to FIG. 3, FIG. 3 is a schematic diagram of an application scenario of a method for updating a deep learning model according to the present embodiment. In the application scenario of FIG. 3, currently the number N of training on a preset deep learning model A is assumed to be 9, a threshold of the number of training is assumed to be 10, and a preset path saving a training dataset is assumed to be P. Assuming the current moment is a moment for triggering the executing the updating of the preset deep learning model A, the server may execute following updating: firstly, as shown by a reference numeral 301, the server may acquire a latest created training dataset under the preset path P, and the server may train the preset deep learning model A based on this training dataset to obtain a new deep learning model B; then, as shown by a reference numeral 302, the server may update the preset deep learning model A to the new deep learning model B; then, as shown by a reference numeral 303, the server may increase the number N of training by 1; then, as shown by a reference numeral 304, the server may compare the number N of training with the threshold 10 of the number of training to determine whether the number N of training reaches the threshold 10; and finally, as shown by a reference numeral 305, the server may determine that the number N of training reaches the threshold 10, and the server may stop executing the updating.

The method provided by the above embodiments of the present disclosure, through: executing the updating to acquire a training dataset under a preset path and train a preset deep learning model based on the training dataset to obtain a new deep learning model; updating the preset deep learning model to the new deep learning model to realize the upgrading of the preset deep learning model; progressively increasing the number of training while executing the updating, to determine whether the number of training reaches the threshold of the number of training; stopping executing the updating if the number of training reaches the threshold; and continuing to execute the updating after a preset time interval if the number of training fails to reach the threshold, thereby may realize regular training and updating of the preset deep learning model, improving the model updating efficiency.

Figure 4:
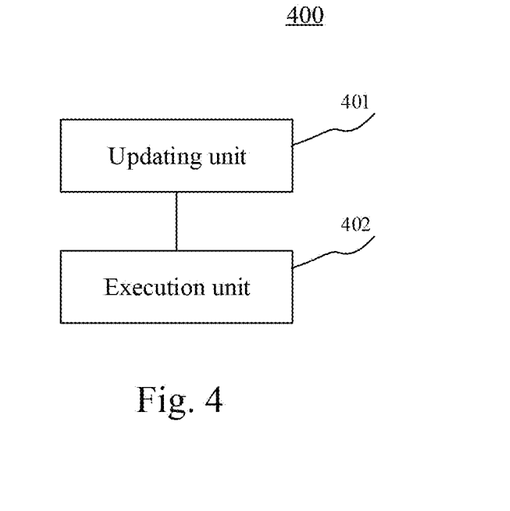
FIG. 4 is a schematic structural diagram of an apparatus for updating a deep learning model according to an embodiment of the present disclosure.

By further referring to FIG. 4, as implementations of the methods shown in the above figures, an embodiment of the present disclosure provides an apparatus for updating a deep learning model. The embodiment of the apparatus corresponds to the embodiment of the method shown in FIG. 2, and the apparatus may be specifically applied to a variety of electronic devices.

As shown in FIG. 4, the apparatus 400 for updating a deep learning model as shown in the embodiment includes: an updating unit 401 and an execution unit 402. Here, the updating unit 401 is configured for executing following updating: acquiring a training dataset under a preset path, training a preset deep learning model based on the training dataset to obtain a new deep learning model; updating the preset deep learning model to the new deep learning model; increasing the number of training; determining whether the number of training reaches a threshold of the number of training; stopping executing the updating if the number of training iterations reaches the threshold; and the execution unit 402 is configured for continuing to execute the updating after a preset time interval if the number of training fails to reach the threshold.

According to the present embodiment, in the apparatus 400 for updating a deep learning model, specific processing of the updating unit 401 and the execution unit 402 and technical effects brought thereby may be respectively referred to the relevant description of the steps 201 and 202 in the embodiments corresponding to FIG. 2, and are not repeated any more here.

In some optional implementations of the present embodiment, the training dataset under the preset path is provided with a dataset identifier containing a time stamp; and the updating unit 401 may include: an acquisition subunit (not shown in the figure), configured for acquiring a training dataset with the time stamp contained in the dataset identifier matching a current time stamp under the preset path.

In some optional implementations of the embodiment, the acquisition subunit may include: a determining module (not shown in the figure), configured for calculating a similarity between the current time stamp and the time stamp contained in a dataset identifier of each training dataset under the preset path, and determining a time stamp with a highest similarity to the current time stamp as a target time stamp matching the current time stamp; and an acquisition module (not shown in the figure), configured for acquiring a training dataset with a dataset identifier containing the target time stamp under the preset path.

In some optional implementations of the embodiment, the preset deep learning model has a training script corresponding to the preset deep learning model; and the updating unit 401 may include: a training subunit (not shown in the figure), configured for running the training script to train the preset deep learning model based on the training dataset to obtain the new deep learning model.

In some optional implementations of the embodiment, the training dataset under the preset path is generated through regularly running a preset training dataset generation code.

In some optional implementations of the embodiment, the updating unit 401 may further include: a saving subunit (not shown in the figure), configured for saving the new deep learning model; and a sending subunit (not shown in the figure), configured for sending a model updating prompt message to a user to whom the preset deep learning model attributed, where the prompt message includes at least one of following items of the new deep learning model: a save path, a save title, and a dataset identifier of the employed training dataset.

The apparatus provided by the above embodiments of the disclosure, through: executing the updating to acquire a training dataset under a preset path and train a preset deep learning model based on the training dataset to obtain a new deep learning model; updating the preset deep learning model to the new deep learning model to realize the upgrading of the preset deep learning model; progressively increasing the number of training while executing the updating, to determine whether the number of training reaches a threshold of training iterations; stops executing the updating if the number of training iterations reaches the threshold of; and continuing to execute the updating after a preset time interval if the number of training fails to reach the threshold, thereby may realize regular training and updating of the preset deep learning model, improving the model updating efficiency.

Figure 5:
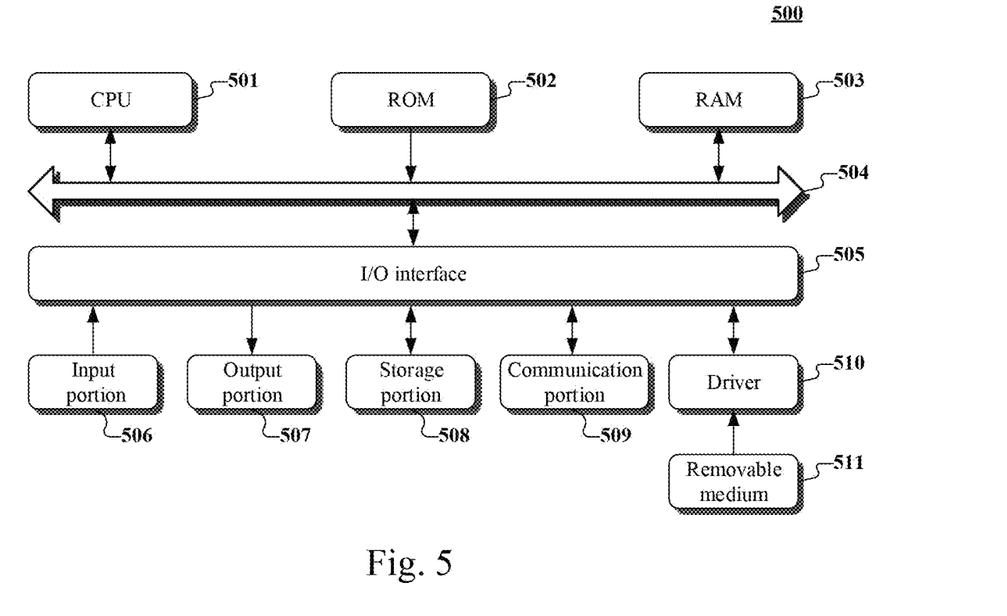
FIG. 5 is a schematic structural diagram of a computer system of an electronic device suitable for implementing the embodiments of the present disclosure.

By referring to FIG. 5, a schematic structural diagram of a computer system 500 suitable for implementing the electronic device according to the embodiments of the present disclosure is shown. The electronic device shown in FIG. 5 is only an example, and should not limit the functions and scope of application of the embodiments of the present disclosure in any way.

As shown in FIG. 5, the computer system 500 includes a central processing unit (CPU) 501, which may execute various appropriate actions and processes in combination with n a program stored in a read only memory (ROM) 502 or a program loaded from a storage part 508 into a random access memory (RAM) 503. Various programs and data required by operations of the system 500 are also stored in the RAM 503. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above-mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, and for example, may be described as: a processor comprising an updating unit and an execution unit, where the names of the units do not in some cases constitute a limitation to such units themselves. For example, the updating unit may also be described as a "unit for executing the updating."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: executing following updating: acquire a training dataset under a preset path, train a preset deep learning model based on the training dataset to obtain a new deep learning model; update the preset deep learning model to the new deep learning model; increase a number of training; determine whether the number of training reaches a threshold of the number of training; stop executing the updating if the number of training reaches the threshold; and continue to execute the updating after a preset time interval if the number of training fails to reach the threshold.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for updating a deep learning model, comprising:
  executing following updating: acquiring a training dataset under a preset path, training a preset deep learning model based on the training dataset to obtain a new deep learning model; updating the preset deep learning model to the new deep learning model; increasing a number of training by 1; determining whether the number of training reaches a threshold of the number of training; stopping executing the updating if the number of training reaches the threshold, wherein an initial number of the number of training is zero; and
  if the number of training fails to reach the threshold, continuing to execute the updating after a preset time interval, such that, before the updating is stopped, the updating is performed periodically by using the preset time interval as a period,
  wherein when the new deep learning model is obtained, the updating further comprises:
  saving the new deep learning model; and
  after updating the preset deep learning model to the new deep learning model, the updating further comprises:

sending, to a user the preset deep learning model attributed to, a model updating prompt message comprising a save path, a save title, and a timestamp of the employed training dataset of the new deep learning model.

2. The method according to claim 1, wherein the training dataset under the preset path is provided with a dataset identifier containing a time stamp; and the acquiring a training dataset under a preset path comprises:

acquiring a training dataset with the time stamp contained in the dataset identifier matching a current time stamp under the preset path.

3. The method according to claim 2, wherein the acquiring a training dataset with the time stamp contained in the dataset identifier matching a current time stamp under the preset path comprises:

calculating a similarity between the current time stamp and the time stamp contained in a dataset identifier of each of a plurality of training datasets under the preset path, and determining a time stamp with a highest similarity to the current time stamp as a target time stamp matching the current time stamp; and acquiring a training dataset with a dataset identifier containing the target time stamp under the preset path.

4. The method according to claim 1, wherein the preset deep learning model has a training script corresponding to the preset deep learning model; and the training a preset deep learning model based on the training dataset to obtain a new deep learning model comprises:

running the training script to train the preset deep learning model based on the training dataset to obtain the new deep learning model.

5. The method according to claim 1, wherein the training dataset under the preset path is generated through regularly running a preset training dataset generation code.

6. The method according to claim 2, wherein the acquiring a training dataset with the time stamp contained in the dataset identifier matching a current time stamp under the preset path comprises:

acquiring a training dataset with the time stamp contained in the dataset identifier identical with the current time stamp under the preset path.

7. An apparatus for updating a deep learning model, comprising:

at least one processor; and a memory storing instructions, the instructions when executed by the at least one processor, cause the at least one processor to perform operations, the operations comprising:

executing following updating: acquiring a training dataset under a preset path, training a preset deep learning model based on the training dataset to obtain a new deep learning model; updating the preset deep learning model to the new deep learning model; increasing a number of training by 1; determining whether the number of training reaches a threshold of the number of training; stopping executing the updating if the number of training reaches the threshold, wherein an initial number of the number of training is zero; and if the number of training fails to reach the threshold, continuing to execute the updating after a preset time interval, such that, before the updating is stopped, the updating is performed periodically by using the preset time interval as a period, wherein when the new deep learning model is obtained, the updating further comprises:

saving the new deep learning model; and after updating the preset deep learning model to the new deep learning model, the updating further comprises:

sending, to a user the preset deep learning model attributed to, a model updating prompt message comprising a save path, a save title, and a timestamp of the employed training dataset of the new deep learning model.

8. The apparatus according to claim 7, wherein the training dataset under the preset path is provided with a dataset identifier containing a time stamp; and the acquiring a training dataset under a preset path comprises:

acquiring a training dataset with the time stamp contained in the dataset identifier matching a current time stamp under the preset path.

9. The apparatus according to claim 8, wherein the acquiring a training dataset with the time stamp contained in the dataset identifier matching a current time stamp under the preset path comprises:

calculating a similarity between the current time stamp and the time stamp contained in a dataset identifier of each of a plurality of training datasets under the preset path, and determining a time stamp with a highest similarity to the current time stamp as a target time stamp matching the current time stamp; and acquiring a training dataset with a dataset identifier containing the target time stamp under the preset path.

10. The apparatus according to claim 7, wherein the preset deep learning model has a training script corresponding to the preset deep learning model; and the training a preset deep learning model based on the training dataset to obtain a new deep learning model comprises:

running the training script to train the preset deep learning model based on the training dataset to obtain the new deep learning model.

11. The apparatus according to claim 7, wherein the training dataset under the preset path is generated through regularly running a preset training dataset generation code.

12. A non-transitory computer readable storage medium storing a computer program, wherein the computer program, when executed by a processor, cause the processor to perform operations, the operation comprising:

executing following updating: acquiring a training dataset under a preset path, training a preset deep learning model based on the training dataset to obtain a new deep learning model; updating the preset deep learning model to the new deep learning model; increasing a number of training by 1; determining whether the number of training reaches a threshold of the number of training; stopping executing the updating if the number of training reaches the threshold, wherein an initial number of the number of training is zero; and if the number of training fails to reach the threshold, continuing to execute the updating after a preset time interval, such that, before the updating is stopped, the updating is performed periodically by using the preset time interval as a period, wherein when the new deep learning model is obtained, the updating further comprises:

saving the new deep learning model; and after updating the preset deep learning model to the new deep learning model, the updating further comprises:

sending, to a user the preset deep learning model attributed to, a model updating prompt message comprising a save path, a save title, and a timestamp of the employed training dataset of the new deep learning model.

\* \* \* \* \*